United States Patent
Trantham et al.

(10) Patent No.: US 10,587,590 B2
(45) Date of Patent: Mar. 10, 2020

(54) TRACKING OF DATA ERASURES

(71) Applicant: Seagate Technology LLC, Cupertino, CA (US)

(72) Inventors: Jon D. Trantham, Chanhassen, MN (US); Mark A. Gaertner, Vadnais Heights, MN (US); Monty Aaron Forehand, Loveland, CO (US); Paul Michael Wiggins, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 198 days.

(21) Appl. No.: 15/620,270

(22) Filed: Jun. 12, 2017

(65) Prior Publication Data
US 2018/0359227 A1    Dec. 13, 2018

(51) Int. Cl.
*H04L 29/06* (2006.01)
*G06F 21/62* (2013.01)

(52) U.S. Cl.
CPC ...... *H04L 63/0457* (2013.01); *G06F 21/6218* (2013.01); *H04L 63/061* (2013.01); *G06F 2221/2143* (2013.01)

(58) Field of Classification Search
CPC ............... H04L 63/0457; H04L 63/061; G06F 12/1408; G06F 2212/1052; G06F 21/6218; G06F 2221/2143
See application file for complete search history.

(56) References Cited

U.S. PATENT DOCUMENTS

| | | | |
|---|---|---|---|
| 6,731,447 B2 | 5/2004 | Bunker et al. | |
| 7,895,403 B1 | 2/2011 | Tormasov et al. | |
| 8,018,617 B2 | 9/2011 | Kortenoeven et al. | |
| 8,793,457 B2 | 7/2014 | Cannon et al. | |
| 9,000,354 B2 | 4/2015 | Woodward et al. | |
| 9,003,546 B2 | 4/2015 | Gross et al. | |
| 9,483,657 B2 | 11/2016 | Paul et al. | |
| 9,542,109 B2 | 1/2017 | Kishi et al. | |
| 2008/0016132 A1 | 1/2008 | Merhar | |
| 2008/0028141 A1 | 1/2008 | Kalos et al. | |
| 2010/0131773 A1* | 5/2010 | Cherian | G06F 21/64 713/193 |
| 2012/0278564 A1* | 11/2012 | Goss | G06F 12/0253 711/155 |
| 2015/0088838 A1 | 3/2015 | Lang et al. | |
| 2015/0286524 A1* | 10/2015 | Trantham | G06F 11/108 714/766 |

(Continued)

OTHER PUBLICATIONS

Dan Colegrove, "End-to-end Data Protection", HGST (Western Digital company), Apr. 2008, 3 pages (Year: 2008).*

*Primary Examiner* — Chau Le
*Assistant Examiner* — Han Yang
(74) *Attorney, Agent, or Firm* — Westman, Champlin & Koehler, P.A.

(57) ABSTRACT

A method includes adding a key version tag to an encryption key store that stores encryption keys. The key version tag is inserted into a data stream. The data stream including the key version tag is written to media. The data in the data stream is erased by scrambling the encryption keys and incrementing the key version tag in the encryption store by a digit. The data stream is replaced with a replacement data pattern when the key version tag stored in the encryption store and the key version tag located in the data stream mismatch.

17 Claims, 7 Drawing Sheets

(56) References Cited

U.S. PATENT DOCUMENTS

2015/0304108 A1* 10/2015 Obukhov ............ G06F 21/6209
                                                    713/193
2017/0103025 A1*  4/2017 Meyer .................... G06F 21/79

* cited by examiner

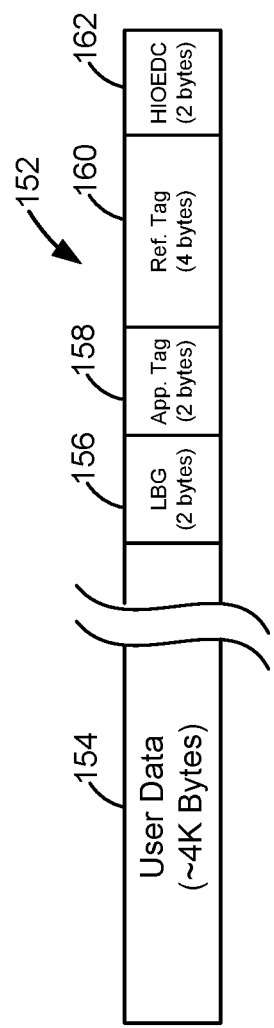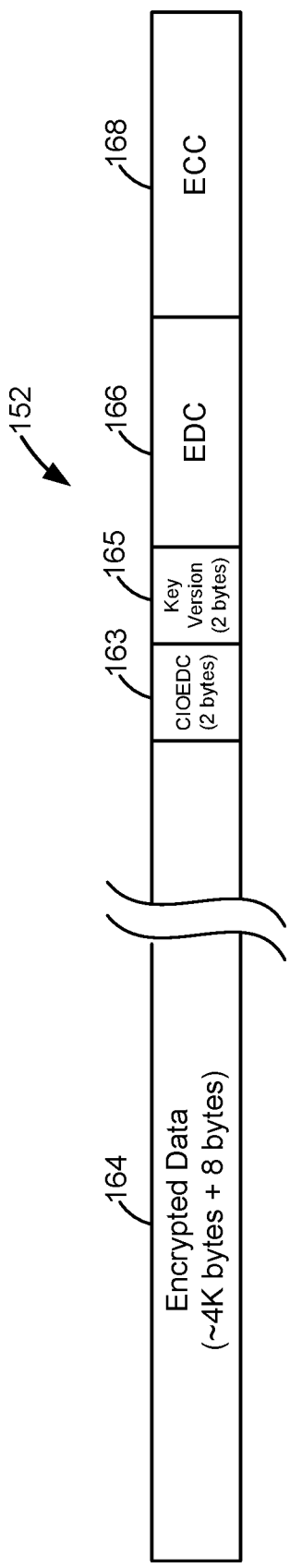

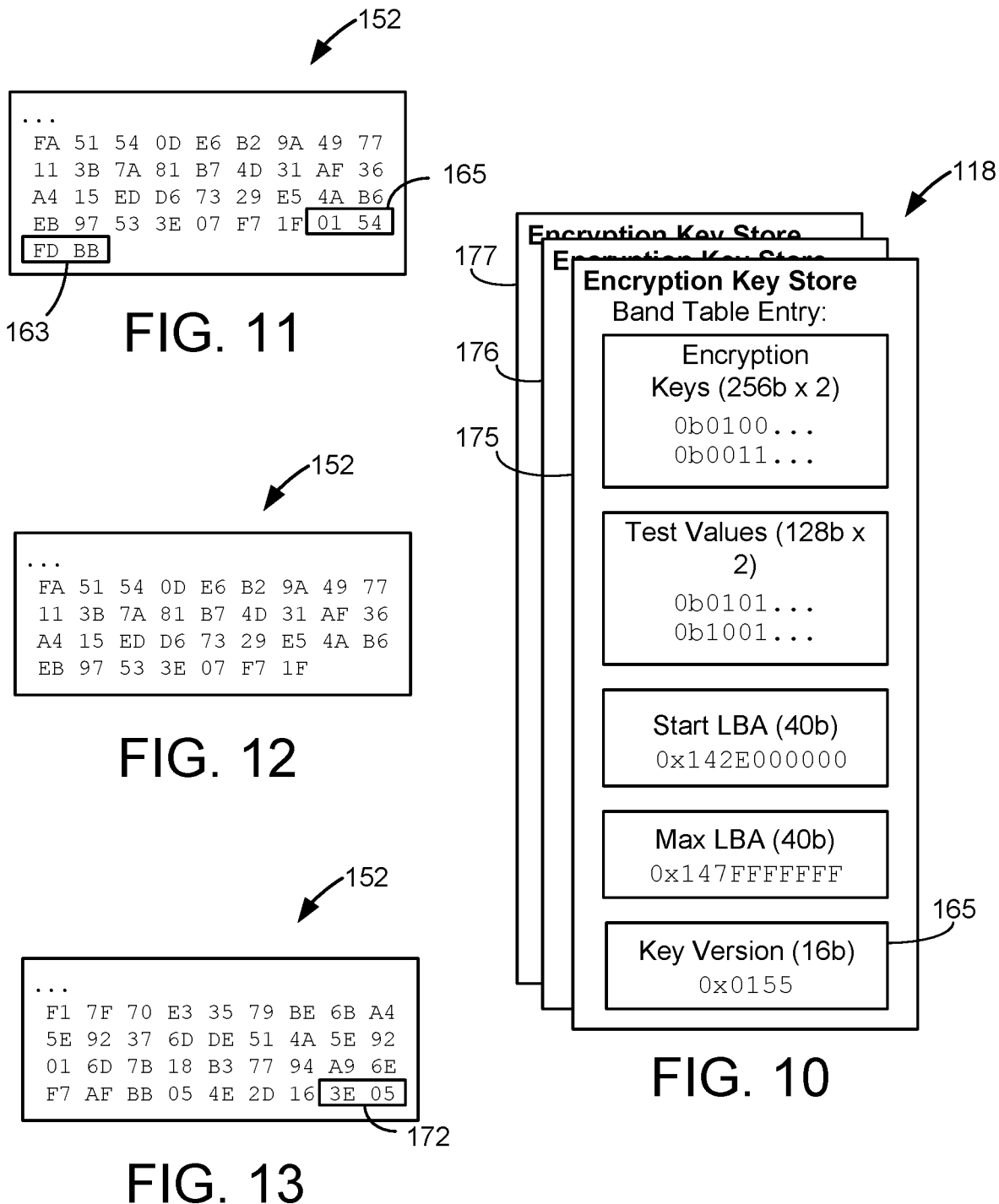

TRACKING OF DATA ERASURES

BACKGROUND

A cloud storage system is a data storage system in which data from multiple users is stored on multiple servers, on multiple data storage devices, in multiple locations and is typically owned by a hosting company called a cloud storage provider. The cloud storage provider is responsible for keeping the data available and accessible and the data storage devices protected and running. Storage capacity is purchased or leased from the cloud storage providers to store data.

SUMMARY

A method includes encrypting a data stream using encryption keys stored in an encryption key store. A key version tag stored in the encryption key store is inserted into the encrypted data stream. The encrypted data stream and the key version tag are stored to media. Data erasure is performed by changing the encryption keys in the encryption key store and the key version tag in the encryption key store. The key version tag stored with the encrypted data stream is compared with the key version tag stored in the encryption key store. When read, some or all of the data stream is replaced with one or more predetermined data patterns when the key version tag stored with the encrypted data stream mismatches the key version tag stored in the encryption key store.

A method includes adding a key version tag to an encryption key store that stores encryption keys. The key version tag is inserted into a data stream when the stream is written. The data stream including the inserted key version tag is written to data storage media. The data in the data stream is erased by changing or scrambling the encryption keys and changing the key version tag in the encryption store, for example by incrementing the key version tag stored in the encryption store by a digit. When read, the data in the data stream is replaced with a replacement data pattern when the key version tag stored in the encryption store and the key version tag located in the data stream mismatch.

A device includes an encryption key store having encryption keys and a key version tag. An encryption/decryption circuit is configured to encrypt data in a data stream using the encryption keys and configured to insert the key version tag into the data stream. A controller is configured to write the encrypted data stream and the key version tag to media and erase the data in the data stream by scrambling the encryption keys in the encryption key store and incrementing the key version tag by a digit. The controller replaces the encrypted data with a replacement pattern upon determining that the key version tag stored in the encryption store and the key version tag located in the data stream mismatch.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 4 is a diagram showing exemplary data fields in a data stream or logical block address (LBA) to be written to media and prior to encryption.

FIG. 5 is a diagram showing data fields in the data stream or LBA of FIG. 4 as written to media according to an embodiment.

FIG. 10 illustrates a diagram of the plurality of band entries in the encryption key store of FIG. 8 after data erasure has been performed according to an embodiment.

FIG. 11 illustrates a diagram of the data stream or LBA of FIG. 6 after data erasure has been performed, but prior to decryption according to an embodiment.

FIG. 12 illustrates a diagram of the data stream or LBA of FIG. 11 where the key version tag and the CIOEDC have been removed.

FIG. 13 illustrates a diagram of the data stream or LBA of FIG. 12 where HIOEDC has been appended according to an embodiment.

FIG. 14 illustrates a diagram of a default data pattern of a data stream or LBA for replacing with the data stream in the LBA of FIG. 14 according to an embodiment.

FIG. 15 illustrates a diagram of the default data pattern that was replaced with the data stream or LBA of FIG. 14 including Protection Information (PI) being replaced according to an embodiment.

FIG. 16 illustrates a diagram of the data stream or LBA of FIG. 15 after LBG has been recalculated according to an embodiment.

DETAILED DESCRIPTION OF ILLUSTRATIVE EMBODIMENTS

Figure 1:
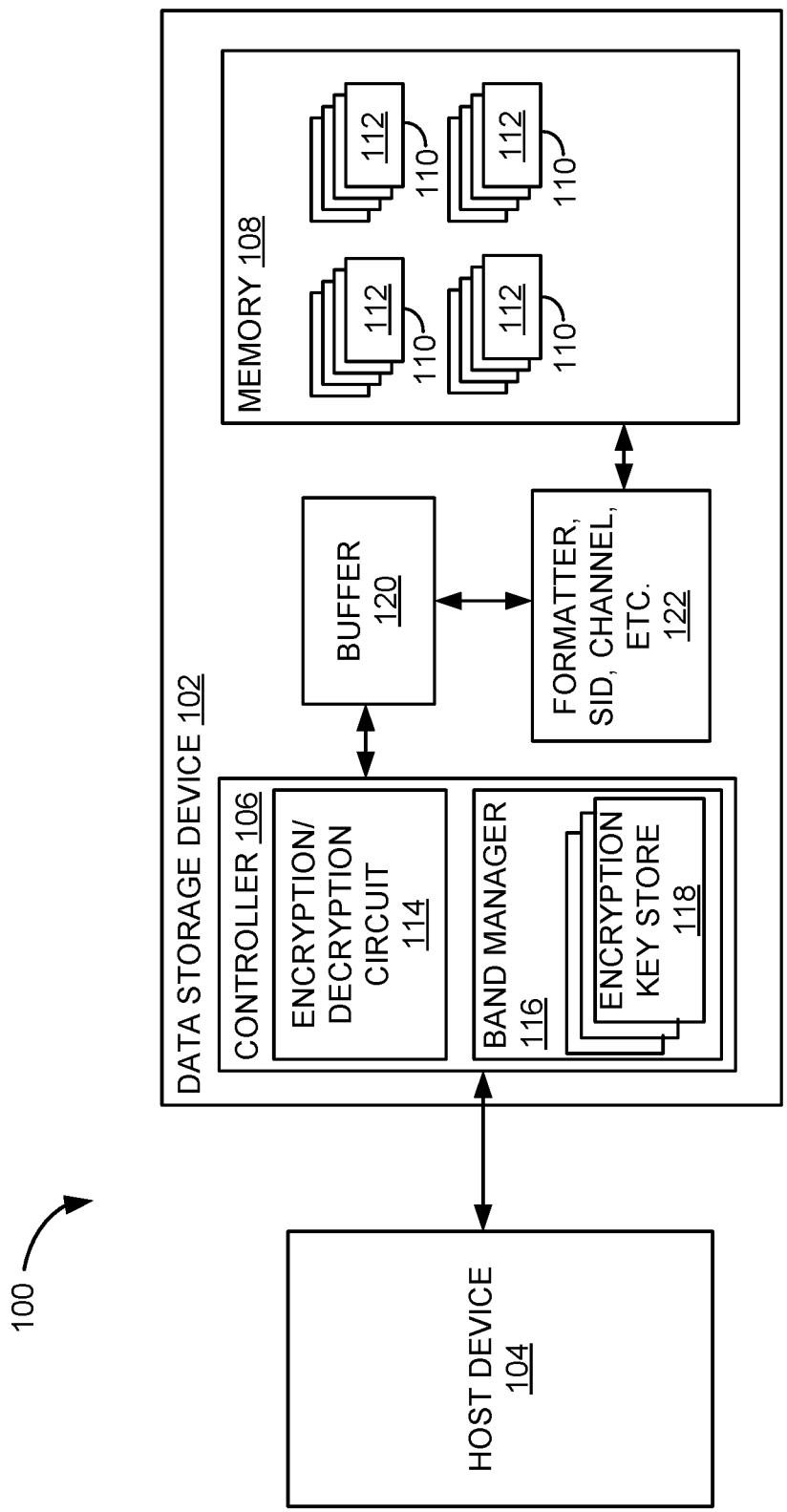
FIG. 1 is a diagram showing a data storage system according to an embodiment.

Security concerns with cloud computing and data storage are faced by both cloud providers as well as their customers. While access controls and firewalls are commonplace, best practices call for protecting stored data in the cloud by encrypting stored data and safely storing the encryption keys for later decryption of the stored data.

The disclosure is related, in particular examples, to a data storage system, such as a RAID system (a data storage technology that combines multiple physical storage device components into a single logical unit for the purposes of data redundancy and improved reliability) or a cloud storage system. These systems may have a variety of different clients and users, and these different clients and users may change over time. In some cases, providers of cloud storage systems need to repurpose data storage allocations between customers.

To protect their customers' information, it is customary to erase or destroy the contents of the old stored data and corresponding data protection information (PI) when switching the allocated storage from one customer to another, and do so quickly. Instant secure erase (ISE) is a quick way to change or scramble the encryption keys for the stored data, also known as crypto-erase or sanitize. ISE works by changing one or more encryption keys used over a region of stored data, thereby scrambling the old stored data into something randomized cryptographically. An ISE leaves the stored data cryptographically randomized when accessed, so that it is no longer decipherable. A new user cannot make sense of the previous user's data storage. However, it is undesirable to return random data to a new user when they attempt to read an unwritten area of data storage. In some systems, it is more desirable to present a new user or customer with a predetermined default data pattern, such as zeroes or all ones or some other type of data pattern. A return of a known data pattern assures the customer that data written to these data storage units in the cloud storage system is unused and available. It is noted that this could be accomplished by overwriting all stored data with a new data pattern, but this operation can take a long time.

In addition to user data, some data storage systems often store additional protection information. For example, the Serial-Attached SCSI (SAS) standard supports protection information (PI) data fields stored along with user data. PI often contains fields for data integrity checks and tags, and one or more of these tags are often used by RAID controllers to keep track of RAID stripe parity validity. Following an ISE, it is desirable for the PI tags to contain a value to indicate to the RAID controller that the RAID stripe is unwritten. Unfortunately, changing the corresponding encryption keys will leave the tags randomized (in designs that encrypt the tags) or in their old state (in designs that do not encrypt the tags). Either is undesirable. In addition, the PI data integrity checks will often fail, since the data has been randomized. It is critical for proper RAID operation to replace PI fields with predetermined values following an ISE.

The systems and methods described herein provide ways to resolve these issues and to return desirable user data patterns and/or PI fields following an ISE. The systems and methods described are particularly useful for data storage systems that employ disk drives; however, the systems and methods described can be applied to solid-state drives, tape, volatile data storage, or generally to any type of data storage device that employs the secure erasing of data for the repurposing of memory/data storage devices.

Embodiments of the disclosure describe systems and methods of tracking ISEs on a data storage device by inserting and storing a key version tag located in an encryption key store in a data stream after data encryption. An instant secure erase operation changes the encryption key for one or more regions of stored data, thereby cryptographically randomizing the data so that its contents are no longer comprehensible. Upon performance of an ISE command on select stored data, not only are the keys changed or scrambled in the encryption key store, but also the key version tag in the encryption key store is incremented by a digit. When the select data is read, the key version tag read from the data stream is compared to the key version tag located in the encryption key store. If the key version tags match, the select data and PI are decrypted and returned because the select data has not received data erasure. However, if the key version tags mismatch, then the select data and PI fields are automatically replaced (if selected) with a known data pattern.

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Referring to FIG. 1, a diagram is shown implementing a data storage system 100 in accordance with an embodiment. Data storage system 100 includes a data storage device 102 and a host device 104 that are communicatively coupled to each other. Storage device 102 includes a controller 106, a data storage memory 108, a buffer 120, such as DRAM (dynamic random access memory), and block 122 which represents other processing components and identifiers to facilitate storage, such as a formatter, error detection and correction circuitry such as a SID (sector iterative decoder) and channel. In some embodiments, data storage memory 108 comprises non-volatile memory such as disc or flash memory; however, other types of memory (e.g., volatile memory) may be implemented to meet the design criteria of a particular application. In non-volatile memory embodiments, memory 108 includes one or more memory devices 110 that in some embodiments have one or more memory regions or targets 112 (e.g., die, pages, discs, data sectors, etc.). As illustrated in FIG. 1, memory devices 110 are generally representative of one type of storage that is enabled to communicate with controller 106. However, in various embodiments, any type of storage memory, including mixed types, is useable such as magnetic storage, optical storage, flash memory, etc.

Controller 106 implements an encryption/decryption circuit 114 and a band manager 116 that has an encryption key storage 118 used by data storage device 102. Controller 106 also includes a command interface configured to receive commands and send responses to host device 104. In embodiments implementing non-volatile memory devices 110, controller 106 includes media controller circuitry, such as a media processor, that manages the non-volatile media 110 and a host processor that manages the host interface. The host processor communicates host commands to the media processor, which processes the commands for storage.

Figure 2:
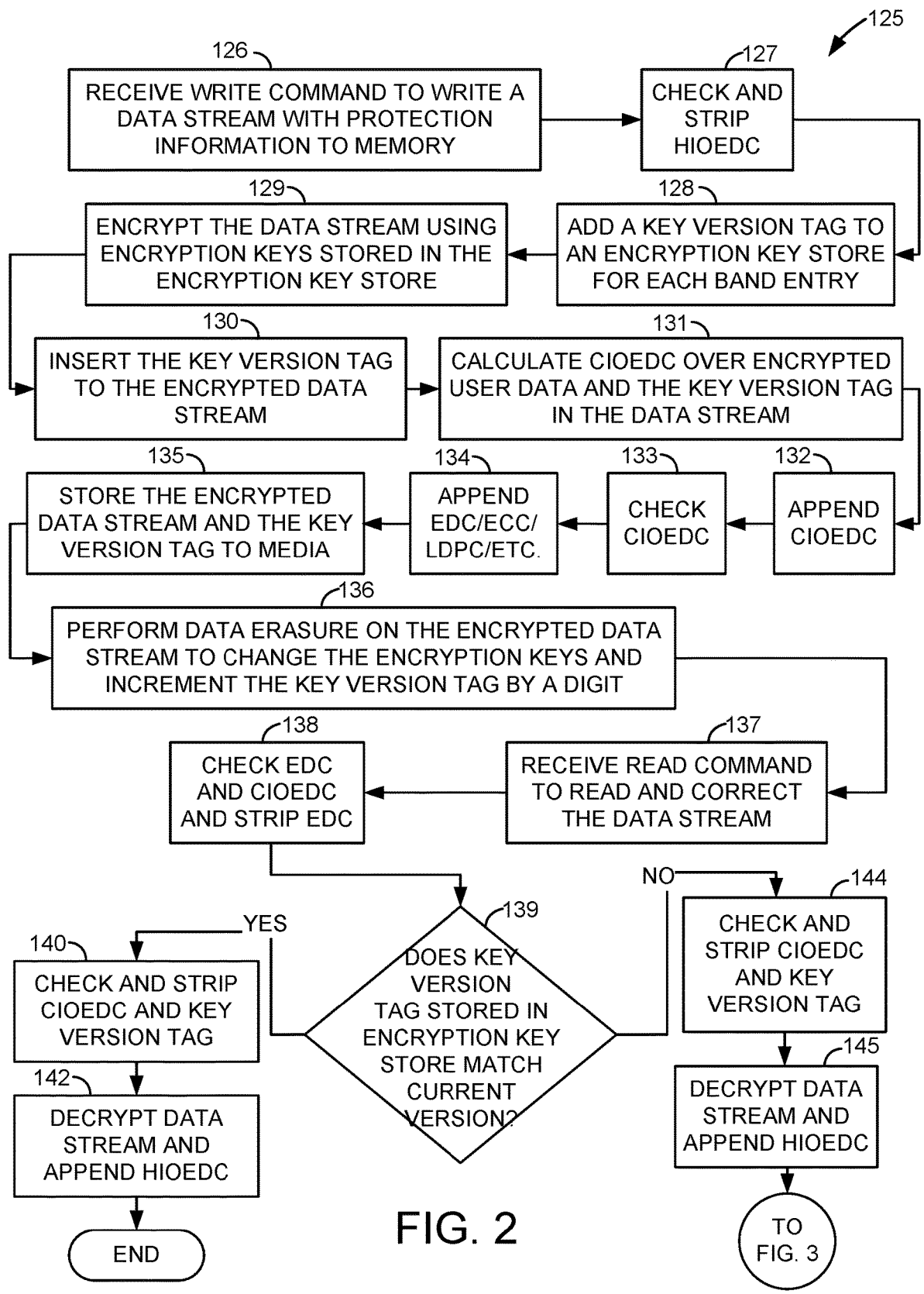
FIGS. 2-3 illustrate a flow diagram showing a method of tracking data erasures on a memory device according to an embodiment.
Figure 3:
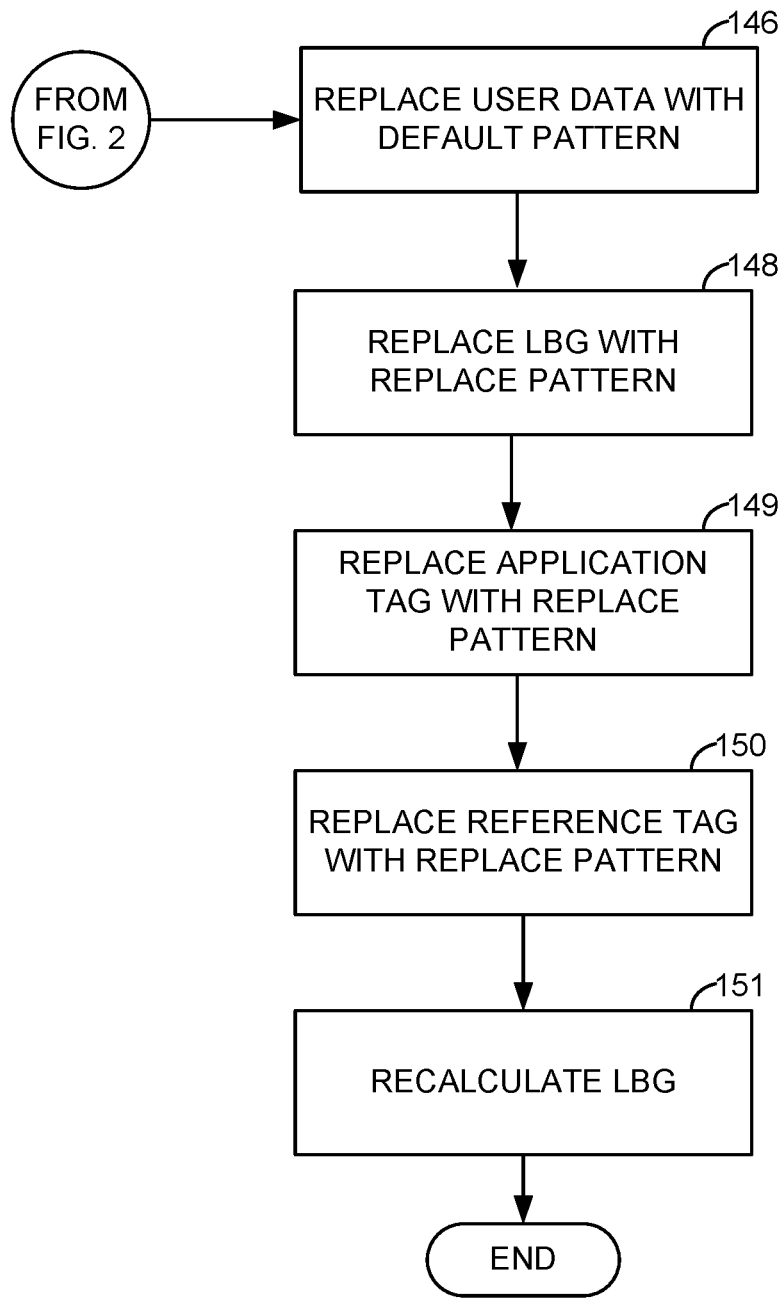

FIGS. 2-3 illustrate a flow diagram 125 showing a method of tracking data erasures on a memory device, such as memory device 108 of data storage system 100, according to an embodiment. At block 126, a data storage device, such as data storage device 102, receives a write command issued by a user from a host device, such as host device 104, to write a data stream with protection information (PI) to a memory within the data storage device, such as memory device 108. In general, the data stream is in the form of one or more blocks of data, addressed by logical block addresses (LBA) and is received by, for example, controller 106. As is common in the data storage industry, a block of data in this disclosure is referred to as an "LBA."

FIG. 4 is a diagram showing exemplary data fields of a block in a data stream or (LBA) 152 that is to be written to media and prior to encryption. LBA 152 includes user data of approximately 4K bytes in user data field 154, a logical block guard (LBG) of 2 bytes in LBG data field 156, an application tag of 2 bytes in application tag data field 158, a reference tag of 4 bytes in reference tag data field 160. Additionally, a LBA may be appended with Input-Output error detection codes, such as a host input output error detection code (HIOEDC) generated internally within the controller, such as HIOEDC data field 162. Together LBG data field 156, application tag data field 158 and reference tag data field 160 comprise protection information (PI) in LBA 152. More specifically PI comprises two tags (application and reference) as well as error detecting code in the form of LBG, which is an error detecting code over the user data. The tags can be of any value and can vary by LBA or data stream. HIOEDC is calculated and appended by host device 104 with the purpose of ensuring that data in data stream or LBA 152 does not become scrambled or altered internally within the device.

Figure 6:
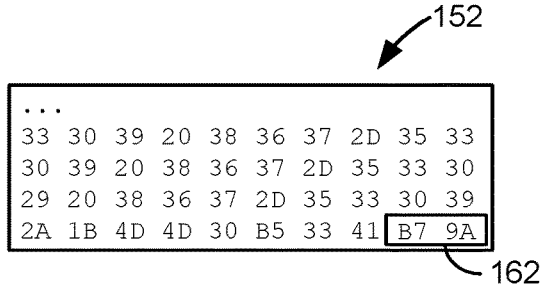
FIG. 6 illustrates another version of a diagram of the data stream or LBA in FIG. 4 according to an embodiment.
Figure 7:
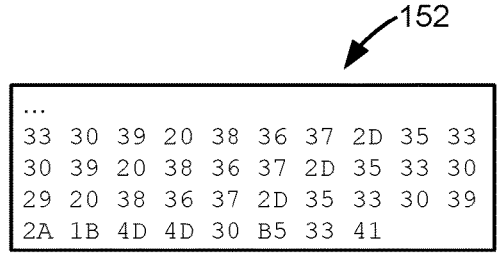
FIG. 7 illustrates the diagram of the data stream or LBA in FIG. 6 that has been stripped of host input output error detection code (HIOEDC).

FIG. 6 illustrates another diagram of exemplary portion of data stream or LBA 152 that contains HIOEDC 162 calculated and appended by host device 104 according to an embodiment. At block 127 in FIG. 2, controller 106 checks and strips HIOEDC 162 as is illustrated in FIG. 7 where data stream or LBA 152 no longer contains HIOEDC 162.

Figure 8:
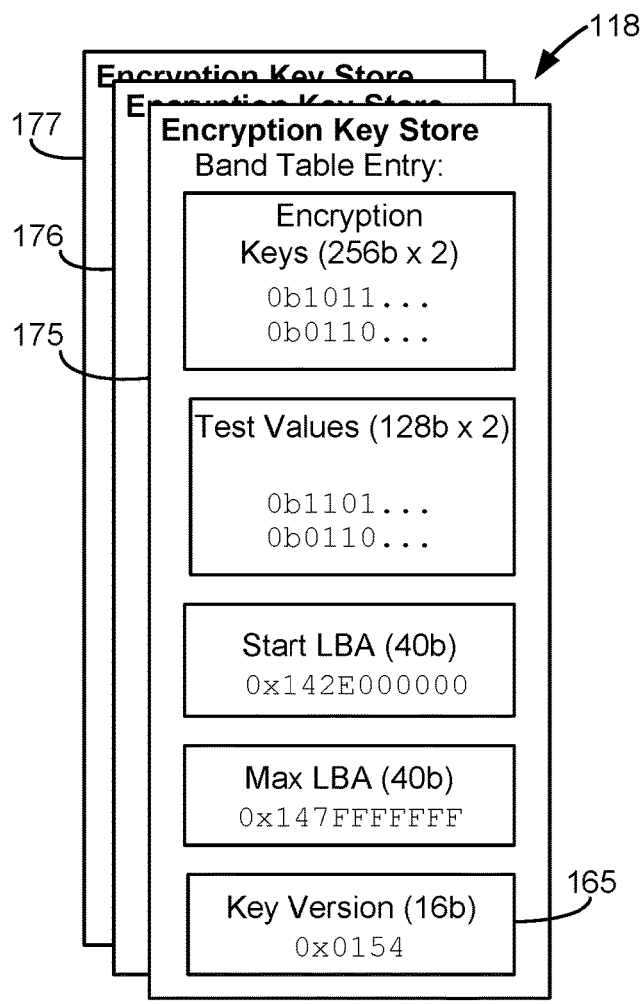
FIG. 8 illustrates a diagram of a plurality of band table entries in an encryption key store according to an embodiment.

FIG. 8 illustrates a diagram of a plurality of band table entries 175, 176 and 177 in an encryption key store 118 according to an embodiment. Each band table entry (175, 176 and 177) includes encryption keys, test values, start LBA and max LBA entries as shown. In addition, added to encryption key store 118 for each band table entry 175, 176 and 177 and as shown in block 128 of the method illustrated in FIG. 2 is a stored key version tag 165.

With reference back to FIG. 2, at block 129, blocks of data stream (LBAs) 152 are encrypted using the encryption keys stored in encryption key store 118. At 130, key version tag 165 stored in encryption key store 118 is inserted into the encrypted data stream for each block after encryption, and at 131, a new "chip" input output error detection code (CIOEDC) is calculated over encrypted user data and key version tag 165. At block 132 CIOEDC 163 is appended to LBA 152.

In an alternate embodiment, the key version tag 165 and CIOEDC 163 may be appended over a group of blocks/LBAs, rather than a single block. In this alternate embodiment, any partial writes, for example of a single LBA within the group, involve reading and checking. If the tag mismatches, the other (unwritten) blocks in the group may be rewritten with the default data pattern and PI fields (if included), and then the appended version tag on the media is updated to the new value from the encryption key store 118.

Figure 9:
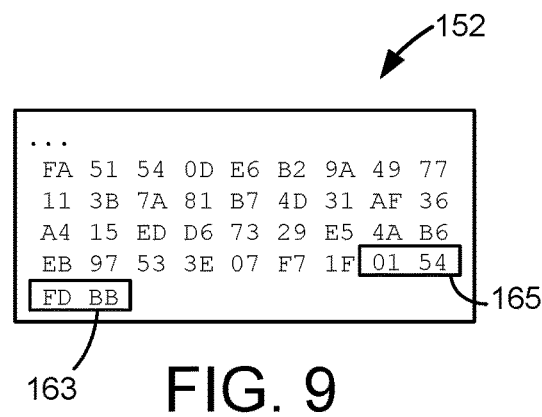
FIG. 9 illustrates a diagram of the data stream or LBA in FIG. 7 that includes an inserted key version tag and an appended chip input output error detection code (CIOEDC).

FIG. 9 illustrates a portion of LBA 152 of FIG. 7, but includes inserted key version tag 165 and appended CIOEDC 163.

With reference back to FIGS. 1 and 2, component 122 checks CIOEDC 163 at block 133 and appends additional error detecting codes, ECC/LDPC parity, etc. at block 134. At block 135, the encrypted data stream, key version tag 165, CIOEDC 163 and additional EDC/ECC/LDPC/etc. are stored to media as an LBA. For example, FIG. 5 is a diagram, according to another embodiment, showing exemplary data fields in data stream or LBA 152 after encryption and as written to and stored in memory 108. After encryption, data stream or LBA 152 includes encrypted data of approximately 4K+8 bytes in encrypted data field 164, CIOEDC data field 163, key version tag data field 165, EDC field 166 and ECC parity field 168. Encrypted data field 164 is a data field for all data encrypted together including user data, LBG and the application and reference tags.

After writing and storing data stream or LBA 152 as illustrated in FIG. 5 to media, there may be a need to repurpose the media and erase the data. One way to erase data is by performing an instant secure erase (ISE) on LBA 152. As mentioned, an ISE changes or scrambles the encryption keys. According to an embodiment and as described in block 136 of FIG. 2, when an ISE or similar data erasure command is issued, the encryption keys are not only changed or scrambled in encryption key store 118, but key version tag 165 in encryption key store 118 is changed, for example, by incremented it by a digit.

FIG. 10 illustrates the diagram of band table entries 175, 176 and 177 in encryption key store 118 of FIG. 8 after encryption keys are changed or scrambled and key version tag 165 has been incremented by a digit according to an embodiment. As illustrated, before the performance of data erasure as shown in FIG. 8, key version tag 165 was indicated as being 0x0154, and after the performance of data erasure as shown in FIG. 10, key version tag 165 is indicated as being 0x0155. As also illustrated, encryption keys and test values in FIG. 10 have been changed from the encryption keys and test values in FIG. 8.

At block 137 in FIG. 2, a read command is received from host 104 and data stored on media is read from data stream or LBA 152 and corrected. At block 138, EDC and CIOEDC 163 are checked and EDC/ECC/LDPC/etc. is stripped so that data stream or LBA 152 looks like that which is shown in FIG. 11. In FIG. 11, data stream or LBA 152 includes key version tag 165 and CIOEDC 163.

The method illustrated in FIGS. 2 and 3 passes to block 139 to determine and make a comparison of whether key version tag 165 stored in encryption key store 118 as illustrate in FIG. 10 matches the current version of key version tag 165 located in and stored in data stream or LBA 152. If key version tag 165 in data stream or LBA 152 matches key version tag 165 located and stored in encryption key store 118, then the method moves to block 140 where CIOEDC 163 is checked and CIOEDC 163 and key version tag 165 are stripped as illustrated in data stream or LBA 152 in FIG. 12. At block 142, the data stream or LBA 152 is decrypted and HIOEDC 172 is appended. Such a decrypted and appended HIOEDC 172 is shown in FIG. 13. The method ends and the data is transmitted to the user through host device 104. The data which was initially written to the media is transmitted to the user because the key version tags match, which means that no ISE erasure has taken place on data stream or LBA 152 and the data is still good.

If, however, key version tag 165 in LBA 152 and key version tag 165 in encryption key store 118 mismatch, then the method moves to block 144. Like block 140, CIOEDC 163, if included, is checked and stripped, as shown in FIG. 12. If CIOEDC is incorrect, the block is re-read from media or an error is reported to the host. At 145, the data are optionally decrypted. Decryption isn't necessary if the data and any PI fields are to be replaced with default patterns. However, some users may prefer instead to have cryptographically scrambled data returned, in which case 145 is performed and an optional host HIOEDC is appended as shown in FIG. 13. At 146 in FIG. 3, the data pattern is optionally replaced with a default pattern. FIG. 14 illustrates data stream or LBA 152 containing a default data pattern.

Still further and because of the mismatch, at block 148, PI data fields are optionally replaced with a default replacement pattern. FIGS. 15 and 16 show a "FF" replacement pattern for example, but the hardware may use other patterns, including 0's, address bytes, etc. In particular, LBG 156 is replaced with a default replacement pattern as shown in FIG. 15. As also illustrated in FIG. 15 and in blocks 149 and 150 of FIG. 3, application tag 158 and reference tag 160 are replaced with a replace data pattern. At block 151 and because of the mismatch, LBG 156 can selectively be recalculated to replace the replace data pattern illustrated in FIG. 15 with the recalculated values as illustrated in FIG. 16.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    writing a data stream with protection information (PI) to memory including:
        encrypting data including user data in the data stream using encryption keys stored in an encryption key store;
        inserting a key version tag stored in the encryption key store into the data stream with the encrypted data and the PI;
        calculating input output error detection code (IOEDC) over the encrypted data and the inserted key version tag and appending the IOEDC in the data stream;
        storing the data stream including the encrypted data, the PI, the inserted key version tag and the IOEDC to media;
    performing data erasure on the data stream stored in the media by changing the encryption keys in the encryption key store to new encryption keys and the key version tag in the encryption key store to a new key version tag;
    reading the erased data stream including:
        comparing the inserted key version tag located in the data stream with the key version tag stored in the encryption key store;
        in response to comparing the inserted key version tag to the key version tag stored in the encryption key store, checking correctness of the IOEDC and if the IOEDC is in error then rereading the IOEDC or reporting the error to a host;
        in response to checking the IOEDC, stripping the IOEDC and the key version tag; and
        in response to stripping the IOEDC and the key version tag, replacing some or all of the data in the data stream with one or more predetermined data patterns when the key version tag that was stored with the encrypted data stream mismatches the key version tag stored in the encryption key store.

2. The method of claim 1, wherein reading the erased data stream further comprises decrypting the encrypted data in the data stream using the new encryption keys before replacing some or all of the data in the data stream with the one or more predetermined data patterns.

3. The method of claim 1, wherein the data stream comprises blocks of user data and the corresponding protection information (PI) comprises corresponding PI fields.

4. The method of claim 3, wherein the PI fields that correspond with the blocks of user data that have been erased are selectively replaced with the predetermined data pattern when their corresponding blocks of user data are read.

5. The method of claim 4, wherein the PI fields comprise a logical block guard (LBG) data field, an application tag field and a reference tag field.

6. The method of claim 5, further comprising recalculating the LBG data field after replacing the blocks of user data, the LBG data field, the application tag field and the reference tag field with the predetermined data pattern.

7. The method of claim 1, wherein the key version tag stored in the encryption key store is incremented whenever the corresponding data stream is erased.

8. A method comprising:
    adding a key version tag to an encryption key store that stores encryption keys;
    inserting the key version tag into a data stream with data including user data encrypted with the encryption keys;
    calculating input output error detection code (IOEDC) over the encrypted data and the inserted key version tag and appending the IOEDC to the data stream;
    writing the data stream including the encrypted data, the inserted key version tag and the IOEDC to media;
    erasing data in the data stream by changing or scrambling the encryption keys and changing the key version tag in the encryption store;
    comparing the inserted key version tag located in the data stream with the key version tag stored in the encryption key store;
    in response to comparing the inserted key version tag to the key version tag stored in the encryption key store, checking correctness of the IOEDC and if the IOEDC is in error then rereading the IOEDC or reporting the error to a host;
    in response to checking the IOEDC, stripping the IOEDC and the key version tag; and
    in response to stripping the IOEDC and the key version tag, replacing the data stream with a replacement data pattern when the key version tag stored in the encryption store and the key version tag located in the data stream mismatch.

9. The method of claim 8, wherein the data stream comprises blocks of data.

10. The method of claim 8 wherein the replacement data pattern comprises a default or known data pattern.

11. The method of claim 8, wherein adding the key version tag to the encryption key store comprises adding the key version tag to the encryption key store before encrypting the data in the data stream using the encryption keys.

12. The method of claim 8, wherein inserting the key version tag into the data stream comprises inserting the key version tag into the data stream after encrypting data in the data stream using the encryption keys.

13. The method of claim 8, further comprising decrypting the encrypted data stream after comparing the key version tag located in the data stream with the key version tag stored in the encryption key store.

14. The method of claim 8, wherein the inserted key version tag is compared to the key version tag stored in the encryption key store upon a request to read data in the data stream stored on the media.

15. A device comprising:
   an encryption key store having encryption keys and a key version tag;
   an encryption/decryption circuit configured to encrypt/decrypt data including user data in a data stream using the encryption keys and configured to insert the key version tag into the data stream after encryption; and
   a controller configured to:
      append input output error detection code (IOEDC) to the data stream that was calculated over the encrypted data and the inserted key version tag;
      write the data stream including the encrypted data and the inserted key version tag to media;
      erase data in the data stream by changing or scrambling the encryption keys in the encryption key store and changing the key version tag in the encryption key store;
      compare the inserted key version tag located in the data stream with the key version tag stored in the encryption key store;
      in response to comparing the inserted key version tag to the key version tag stored in the encryption key store, check correctness of the IOEDC and if the IOEDC is in error then rereading the IOEDC or reporting the error to a host;
      in response to checking the IOEDC, strip the IOEDC and the key version tag; and
      in response to stripping the IOEDC and key version tag, replace some or all of the data stream with one or more predetermined patterns upon determining that the key version tag stored in the encryption store and the key version tag located in the data stream mismatch.

16. The device of claim 15, wherein the encryption/decryption circuit is configured to decrypt the encrypted data stream after the controller compares the key version tag located in the data stream with the key version tag stored in the encryption key store before.

17. The device of claim 15, wherein the controller is configured to compare the key version tag located in the data stream with the key version tag stored in the encryption key store upon a request to read data in the data stream stored on the media.

* * * * *